United States Patent
Chen et al.

(10) Patent No.: US 7,682,063 B2
(45) Date of Patent: Mar. 23, 2010

(54) LIGHT GUIDE PANEL AND BACKLIGHT MODULE USING THE SAME

(75) Inventors: Chih-Yen Chen, Hsin-Chu (TW); Han-Ping Kuo, Hsin-Chu (TW)

(73) Assignee: AU Optroncis Corporation, Hsin-Chu (TW)

( * ) Notice: Subject to any disclaimer, the term of this patent is extended or adjusted under 35 U.S.C. 154(b) by 204 days.

(21) Appl. No.: 11/861,410

(22) Filed: Sep. 26, 2007

(65) Prior Publication Data

US 2008/0186739 A1    Aug. 7, 2008

(30) Foreign Application Priority Data

Feb. 7, 2007    (TW) ................ 96104498 A

(51) Int. Cl.
*F21V 7/04*    (2006.01)
*F21V 5/00*    (2006.01)

(52) U.S. Cl. ............ 362/624; 362/626; 362/330; 362/331

(58) Field of Classification Search ......... 362/330–332, 362/620, 625, 626
See application file for complete search history.

(56) References Cited

U.S. PATENT DOCUMENTS 6,843,582 B2 *    1/2005    Chang ................ 362/240

2003/0173492 A1 *    9/2003    Kajiyama ............... 249/160
2007/0035948 A1 *    2/2007    Liao ....................... 362/245
2007/0217226 A1 *    9/2007    Zhu et al. ................ 362/615

FOREIGN PATENT DOCUMENTS

TW    240529    8/2004
TW    286932    2/2006

OTHER PUBLICATIONS

English language translation of abstract of TW 240529.
English language translation of abstract of TW 286932.

* cited by examiner

*Primary Examiner*—Ali Alavi
(74) *Attorney, Agent, or Firm*—Thomas, Kayden, Horstemeyer & Risley

(57) ABSTRACT

The present invention provides a light guide panel and a backlight module using the light guide panel. The light guide panel is disposed corresponding to a light source module of the backlight module. The light guide panel mainly comprises a plate, a plurality of microstructures and a plurality of protrusions. The plate is disposed close to the light source module and includes a microstructure surface. The microstructures and the protrusions are disposed on the microstructure surface, and the heights of the protrusions are greater than those of the microstructures, and a plurality of the microstructures are disposed between the adjacent protrusions.

36 Claims, 7 Drawing Sheets

LIGHT GUIDE PANEL AND BACKLIGHT MODULE USING THE SAME

This application claims benefit to a Taiwan Patent Application No. 096104498 filed Feb. 7, 2007.

BACKGROUND OF THE INVENTION

1. Field of the Invention

The present invention relates generally to light guide panels and backlight modules using the same, and more particularly to a light guide panel for liquid crystal display (LCD) devices and a backlight module using the light guide panel.

2. Description of the Prior Art

LCD devices have been used extensively in liquid crystal televisions (LCTVs), computers, cell phones and personal digital assistants (PDAs). Due to the ever increasing size and the product standard keeps enhancing, for LCD devices having advantages such as lightweight, low power consumption and low radiation, the market boundary for these devices keeps expanding. The backlight module is one of the important elements in LCD devices. Since liquid crystal materials in the LCD devices are not self luminous, the backlight modules are needed to provide light and to achieve display effect. As the application level of various panel dimensions of the LCD devices keep expanding, the backlight module industry has been on an upward trend over a long period or time. Especially, the market demand for LCD devices in recent years has increased considerably. In order to accord with functional and outward appearance requirements of the LCD devices, the backlight module design for LCD devices has gradually become multidimensional.

A backlight module mainly comprises a light guide plate, a light source module, a reflector and one to a plurality of optical films. In order to achieve design objectives of backlight modules, such as low power, high brightness, uniform luminosity and controllable view angle, the optical elements within the backlight module use various optical designs to enhance light utilization efficiency. The primary function of a light guide plate is to guide the light path and to achieve uniform brightness. Due to the fact that the refractive index of a light guide plate is greater than ambient atmosphere, light paths within the light guide plate travel mostly by way of total reflection. In addition, a plurality of microstructures is disposed on part of the bottom surface or top surface of the light guide plate to enhance overall light output uniformity and luminance.

FIG. 1 shows a conventional backlight module. As shown in FIG. 1, the backlight module comprises a light guide plate 80, a light source module 40, a light source diffusion module 60 and a reflector 20. The light source module 40 is disposed on the lateral side of the light guide plate 80, the reflector 20 is disposed under the light guide plate 80, and the light source diffusion module 60 is disposed above the light guide plate 80. A plurality of microstructures 83 is disposed on a bottom surface 81 of the light guide plate 80. The microstructures 83 are V-shaped grooves, and pointy ends 85 are formed between the two grooves. As shown in FIG. 1, the bottom surface 81 of the light guide plate 80 and the reflector 20 are superimposed, and the pointy ends 85 touch against the reflector 20.

In the conventional backlight module design in FIG. 1, the microstructures 83 on the light guide plate 80 contact directly with the reflector 20. However, the contact between the microstructures 83 and the reflector 20 frequently damages the microstructures 83 and the reflector 20. For example, abrasion between the microstructures 83 and the reflector 20 caused by transport, vibration tests or other relative movements results in scrapes on the microstructures 83, and further white spots, luminance streaks (mura) and poor pervious to light on LCD panel. The scrape issue of the microstructures may cause the loss of optical characteristics of the light guide plate, disable it to reach the intended performance, result in a defective product, and even the overall production yield of the backlight module is reduced and the cost of production is increased. Accordingly, how to protect the light guide plate and the optical elements next to the light guide plate from scrape and abrasion has posed a major challenge to the backlight module design.

FIG. 2 shows an improved structure of a conventional backlight module. As shown in FIG. 2, the backlight module comprises a light guide plate 90, a light source module 30, a light source diffusion module 50 and a reflector 10. The light source module 30 is disposed on the lateral side of the light guide plate 90, the reflector 10 is disposed under the light guide plate 90, and the light source diffusion module 50 is disposed above the light guide plate 90. A plurality of microstructures 93 is disposed on a bottom surface 91 of the light guide plate 90. The microstructures 93 are V-shaped grooves, and plane surfaces are between the two grooves. As shown in FIG. 2, the bottom surface 91 of the light guide plate 90 is superimposed with the reflector 10, and the plane surfaces 95 touch against the reflector 10.

The improved structure eliminates the contact issue of pointy ends of the microstructures in the conventional backlight module, and planar contact is utilized to distribute the concentration of force, thus the contact abrasion between the microstructures 93 and the reflector 10 is reduced, and scrape and abrasion occurrences of the light guide plate 90 is reduced as well. However, the microstructures 93 and the reflector 10 still have a fairly large surface contact in this improved structure. Although the plane surfaces 95 touching against the reflector 10 help reduce the abrasion degree of the microstructures 93, the planar surface contact between the plane surfaces 95 and the reflector 10 may still create scrape and abrasion issues.

SUMMARY OF THE INVENTION

It is an object of the present invention to provide a light guide panel that reduces scrape occurrences of the microstructures thereon.

It is another object of the present invention to provide a backlight module that protects the light guide panel and the optical elements within.

It is a further object of the present invention to provide a backlight module that enhances the overall production yield and reduces the cost of production.

The backlight module in accordance with the present invention mainly comprises a light guide panel, a light source module, one to a plurality of optical films and a reflector. The light source module preferably has a lamp tube and a reflection shell, and light rays emitting from the lamp tube and reflecting from the reflection shell shoot to the outside of the light source module.

The light guide panel mainly comprises a plate, a plurality of micro-structures and a plurality of protrusions. The plate has a top surface, a bottom surface, a light entrance surface and a microstructure surface. The light entrance surface is formed on the lateral side of the plate and is corresponding to the light source module. When the lamp tube of the light source module emits light, the light will enter into the light guide panel through the light entrance surface of the plate.

Both the microstructures and the protrusions are disposed on the microstructure surface. In the preferred embodiment, the microstructure surface is disposed on the bottom surface of the plate. The heights of the protrusions are greater than those of the microstructures, and a plurality of microstructures are disposed between the adjacent protrusions. The number of the microstructures disposed between the adjacent protrusions ranges between 5 and 20, the interval between the adjacent protrusions ranges between 0.25 millimeter (mm) and 1 mm, and the protrusions are at least 1 mm higher than the microstructures.

The microstructures are preferably elongated prisms and are disposed parallel to each other on the microstructure surface. The protrusions are preferably bar structures. The protrusions extend along the microstructure surface and preferably parallel the microstructures. The protrusions preferably have trapezoid cross sections and the top surface widths of the trapezoid cross sections range between 5 micrometer (μm) and 15 μm. In the preferred embodiment, the microstructures and the protrusions either parallel or perpendicular to the light incident direction.

The backlight module further comprises the reflector, and the optical films are disposed above the top surface of the plate and the reflector is disposed under the bottom surface of the plate. In the preferred embodiment, the protrusions disposed on the microstructure surface touch against the reflector, and it makes the microstructures disposed on the microstructure surface not directly contact with the reflector. In other words, a gap exists between the microstructures and the reflector. Consequently, the protrusions touching against the reflector help prevent contact abrasion between the microstructures and the reflector, and reduce the number of defective products. Moreover, the overall production yield of the backlight module is increased, and the cost of production is reduced.

DETAILED DESCRIPTION OF THE PREFERRED EMBODIMENT

The present invention provides a light guide panel and a backlight module using the light guide panel. The primary purpose of the light guide panel is to guide light path and to make uniform light output from the backlight module. For the preferred embodiment, the backlight module is used in a liquid crystal display (LCD) device. However, in other embodiments, the backlight module may be used in computer keyboards, cell phone buttons, billboards and other devices requiring flat light sources. Specifically speaking, the present invention further includes a LCD device using the light guide panel. In the preferred embodiment, the LCD device in accordance with the present invention includes a color LCD device. However, in other embodiments, the LCD device in accordance with the present invention may include a monochromatic LCD device. The aforementioned LCD device refers generally to display devices using LC panels, including LC display screen of household LCTVs, computers, cell phones and digital cameras.

Figure 1:
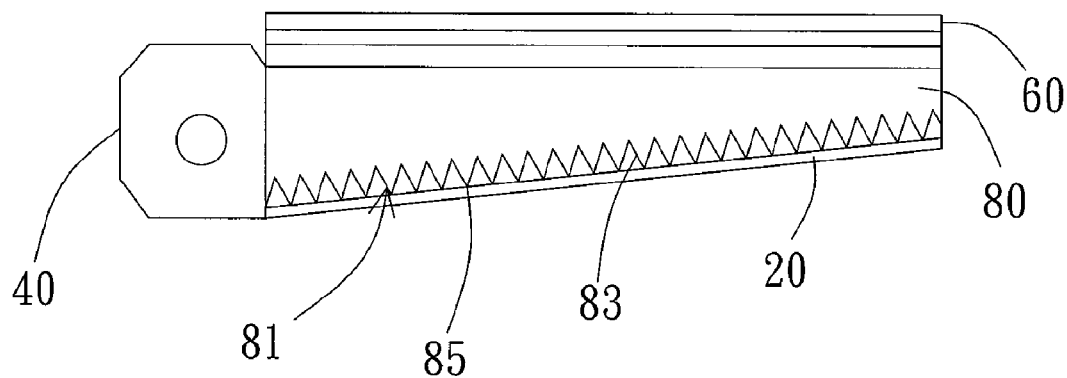
FIG. 1 illustrates a schematic diagram of a prior art backlight module.
Figure 2:
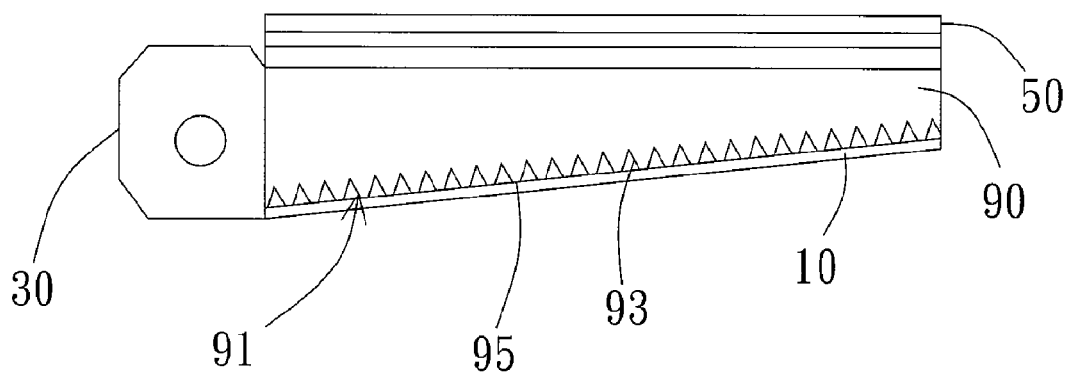
FIG. 2 illustrates a schematic diagram of an improved structure of a prior art backlight module.
Figure 3:
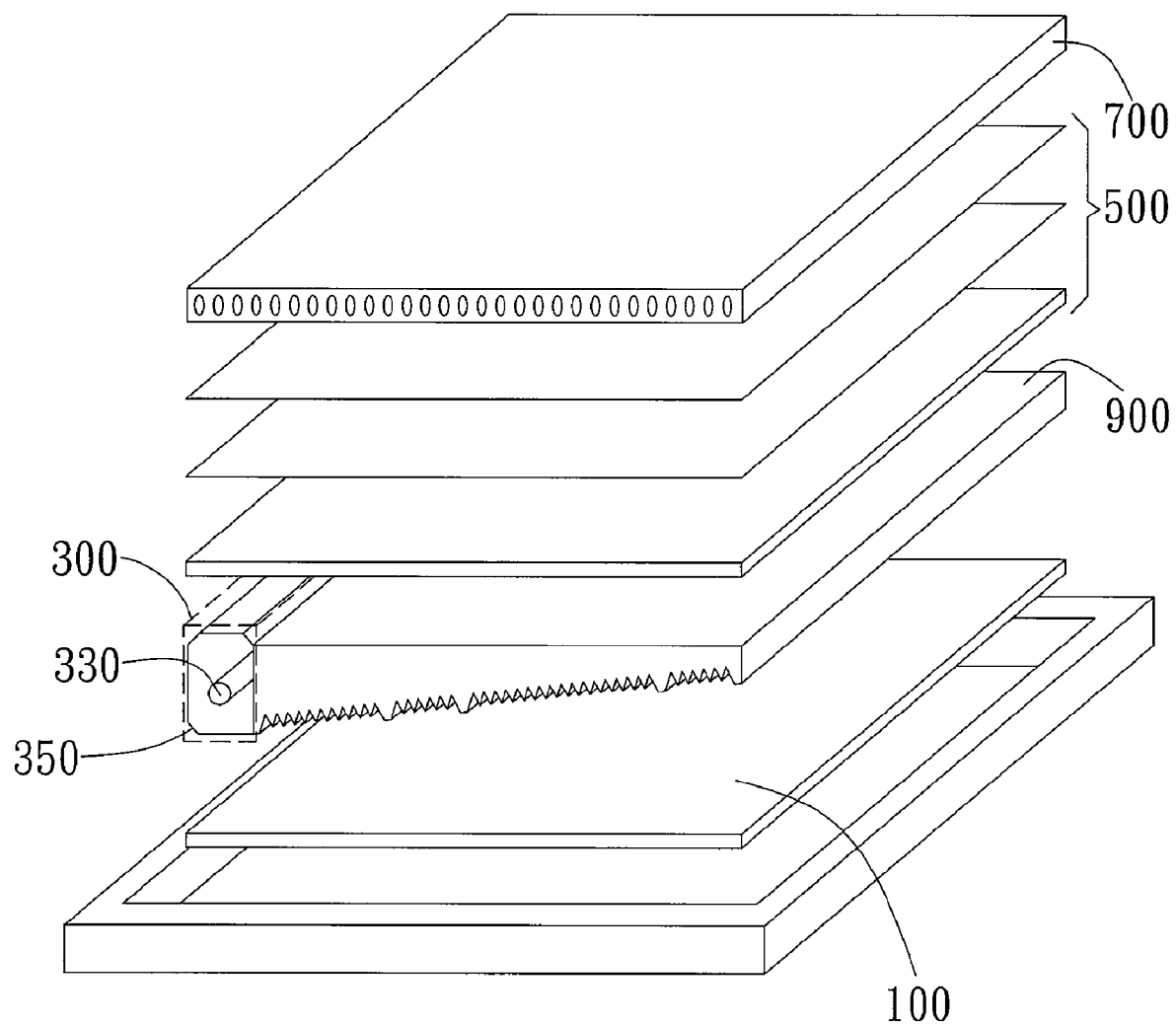
FIG. 3 illustrates a schematic diagram of one assembly embodiment of the backlight module and the liquid crystal panel (LCD) in accordance with the present invention.
Figure 4:
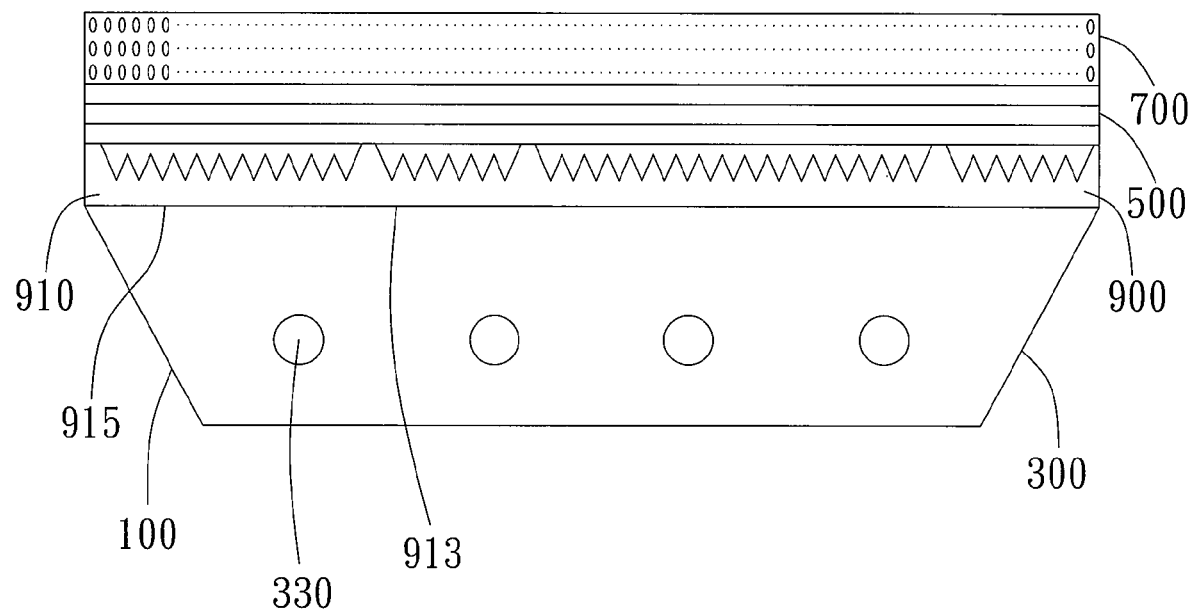
FIG. 4 illustrates a cross-sectional schematic diagram of one embodiment of the backlight module according to the present invention.

As shown in FIG. 3, the backlight module in accordance with the present invention mainly comprises a light guide panel 900, a light source module 300, one to a plurality of optical films 500 and a reflector 100. A LCD panel 700 is disposed above the backlight module. The light source module 300 has a lamp tube 330 and a reflection shell 350. When the lamp tube 330 emits light, parts of the light will ray directly to the outside of the light source module 300. The light going other directions will be reflected through the reflection shell 350 and eventually directed to the outside of the light source module 300. In the preferred embodiment, the reflection shell 350 is made of silver film by evaporation and polyethylene terephthalate (PET); however, in other embodiments, the reflection shell 350 may be made primarily of copper materials. Moreover, the light source module 300 may use other light sources besides the lamp tube 330, such as light emitting diodes (LEDs). In the embodiment shown in FIG. 3, the light source module 300 takes a side-lighting type lamp tube. However, in other embodiments, as shown in FIG. 4, the light source module 300 may be bottom-lighting type lamp tube.

Figure 5:
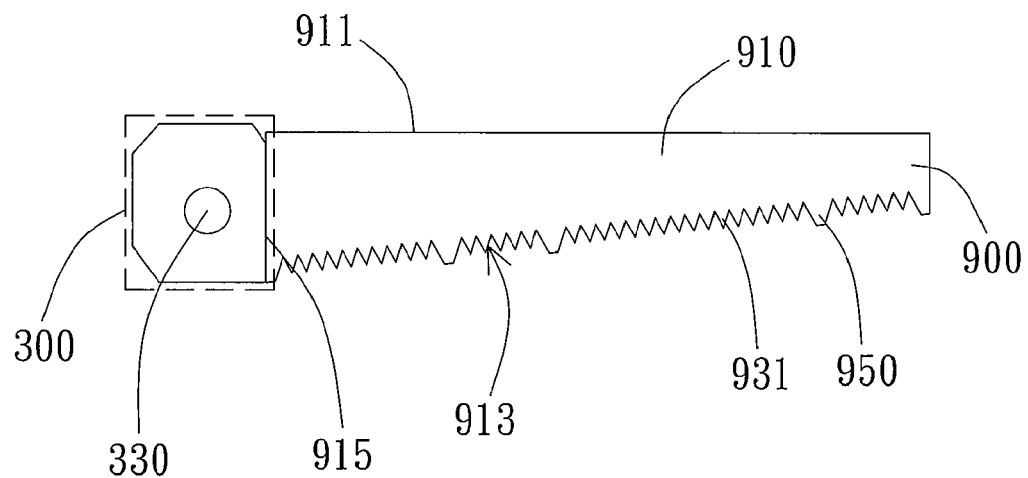
FIG. 5 illustrates a cross-sectional schematic diagram of the light source module, the light guide panel and the microstructure surface assembly according to one embodiment of the present invention.

As shown in FIG. 5, the light guide panel 900 is disposed corresponding to the light source module 300, and the light source module 300 is preferably disposed on the side of the light guide panel 900. The light guide panel 900 mainly includes a plate 900, a plurality of microstructures 931 and a plurality of protrusions 950. The plate 910 has a top surface 911, a bottom surface 913 and a light entrance surface 915. The light entrance surface 915 is preferably formed on the lateral side of the plate 910 and is corresponding to the light source module 300. In the embodiment using the side-lighting type light source shown in FIG. 5, the light source module 300 is set corresponding to the light entrance surface 915 of the plate 910. When the lamp tube 330 of the light source module 300 emits light, the light will enter into the light guide panel 900 through the light entrance surface 915 of the plate 910. However, as the embodiment shown in FIG. 4, when bottom-lighting type light source is employed, the light entrance surface 915 of the plate 910 is formed on the bottom surface 913 of the plate 910, i.e. the light will enter the light guide panel 900 through the bottom surface 913 of the plate 910. In addition, as shown in FIG. 5, the light guide panel 900 is preferably a light guide panel having a wedge-shaped cross-section. However, in other embodiments, the light guide panel 900 may be of rectangular or other different shapes.

Figure 6:
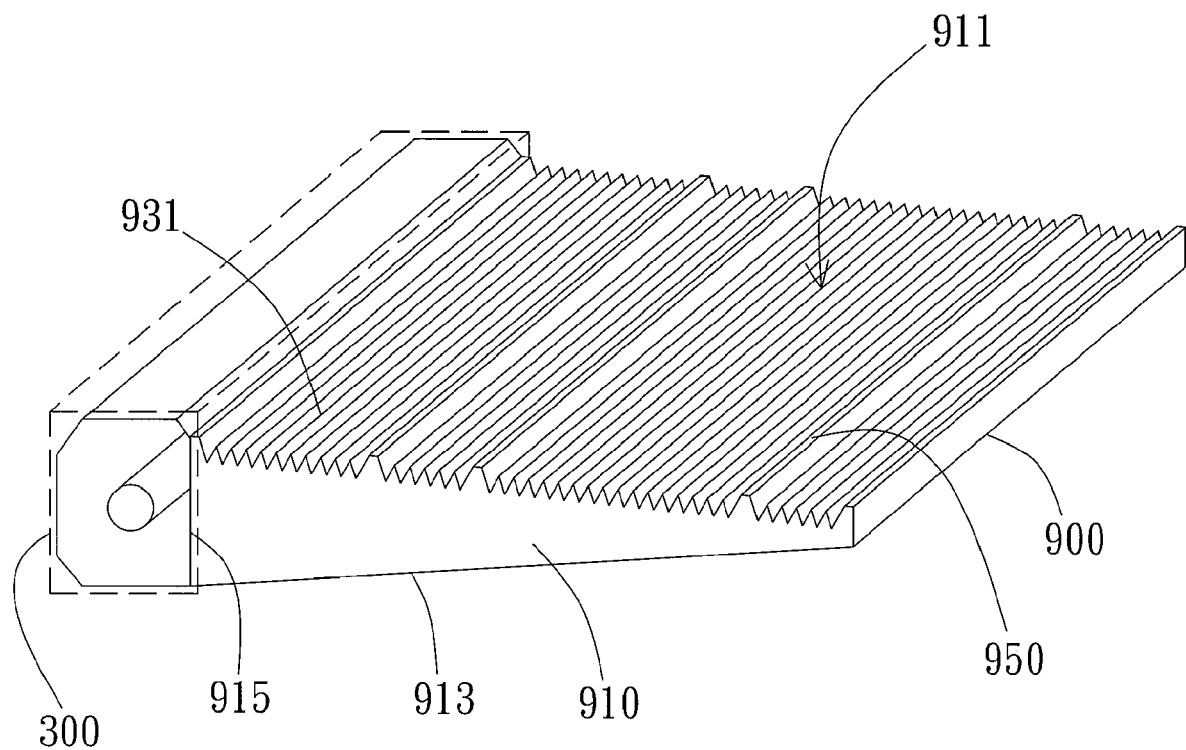
FIG. 6 illustrates a schematic diagram of another assembly embodiment of the light source module, the light guide panel and the microstructure surface.

Both the microstructures 931 and the protrusions 950 are disposed on the microstructure surface. As shown in FIG. 5, the microstructure surface is preferably formed on the bottom surface 913 of the plate 910. However, in other embodiments, as shown in FIG. 6, the microstructure surface may be formed on the top surface 911 of the plate 910. The primary purpose of the disposed microstructures 931 is to alter or affect behavior of light within the light guide panel 900 or of light entering/exiting the light guide panel 900 by employing optical properties of the microstructures 931. The heights of the protrusions 950 are greater than those of the microstructures 931, and a plurality of the microstructures 931 are disposed between the adjacent protrusions 950. In the preferred embodiment, the number of the microstructures 931 disposed between the adjacent protrusions 950 ranges between 5 and 20, the interval between the adjacent protrusions 950 ranges between 0.25 millimeter (mm) and 1 mm, and the protrusions 950 are at least 1 mm higher than the microstructures 931.

As shown in FIG. 6, the microstructures 931 are preferably elongated prisms and disposed parallel to each other on the microstructure surface. In another embodiment shown in FIG. 7, the microstructures 931 are micro-lens formed by hemispherical protruding parts. However, in other embodiments, the microstructures 931 may be other geometric protruding parts or lens structures, such as tetrahedron, polygon, etc. Furthermore, in the embodiment shown in FIG. 6, the elongated prisms forming the microstructures 931 have triangular cross sections. However, in other embodiments, the microstructures 931 may be formed by elongated prisms having other cross sectional shapes, including quadrilateral, etc. or semi-cylindrical lens.

Figure 7:
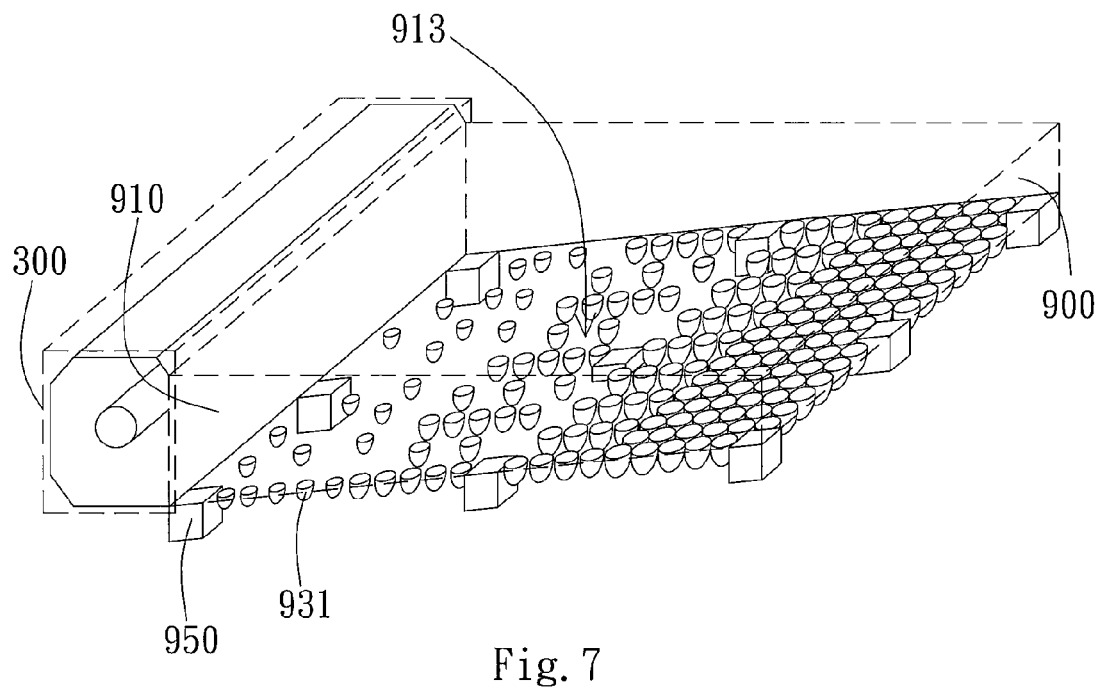
FIG. 7 illustrates a schematic diagram of a further assembly embodiment of the light source module, the light guide panel and the microstructure surface.
Figure 8:
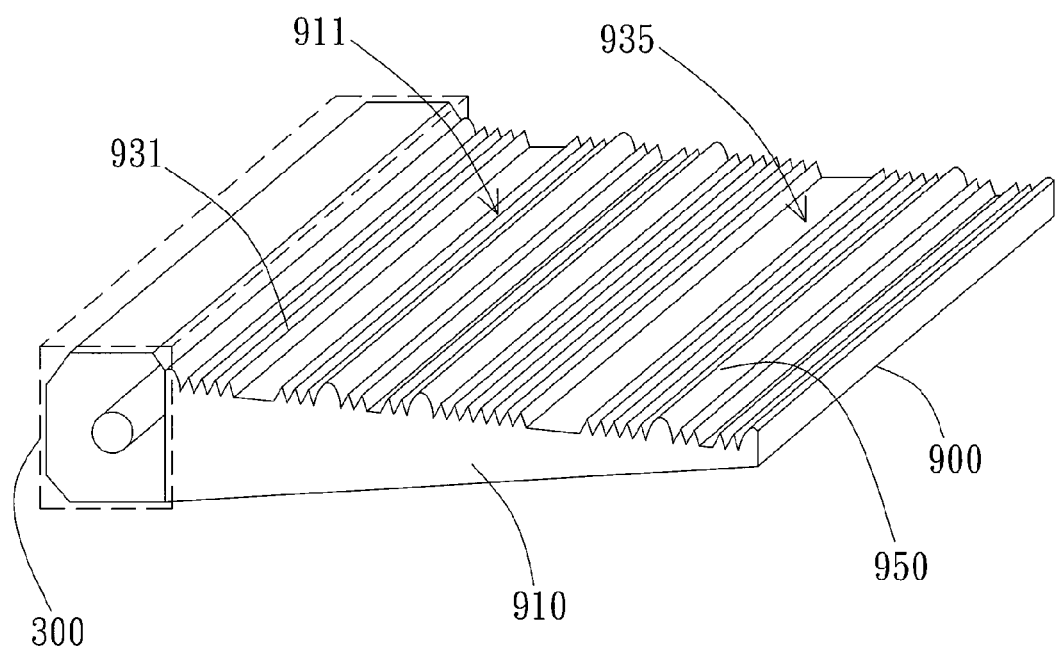
FIG. 8 illustrates a schematic diagram of still another assembly embodiment of the light source module, the light guide panel and the microstructure surface.

The protrusions 950 are preferably bar structures. As shown in FIG. 6, the protrusions 950 extend along the microstructure surface and preferably parallel the adjacent microstructures 931. The protrusions 950 preferably have trapezoid cross sections, and the top surface widths of the trapezoid cross sections range between 5 micrometer (μm) and 15 μm. In another embodiment shown in FIG. 8, the protrusions 950 have semicircular cross sections. Moreover, in other embodiments, the protrusion 950 may have polygonal or other different-shaped cross sections. In the embodiment shown in FIG. 7, the protrusions 950 may even be protruding posts. As shown in FIG. 7, the protrusions 950 are cubic protruding posts. However, in other embodiments, the protrusions 950 may be other geometric protruding posts, such as cylinders, hemispheres, polygons, etc.

The microstructures 931 and the protrusions 950 are preferably formed on the microstructure surface by machining processes. The machining processes include mechanical cutting, screen printing, chemical etching, optical lithography, adhesion and rolling, etc. However, in other embodiments, the microstructures 931 and the protrusions 950 and the microstructure may be integratedly formed by injection molding or by other methods.

In the preferred embodiment, the light guide panel 900 is made of polymethyl methacrylate (PMMA). However, in other embodiments, the light guide panel 900 may be made of other light-pervious materials, such as polypropylene resin. The microstructures 931 and the protrusions 950 may be made of the materials same as the light guide panel 900. However, in other embodiments, the microstructures 931 and the protrusions 950 may also be made of other light-pervious materials.

Figure 9A:
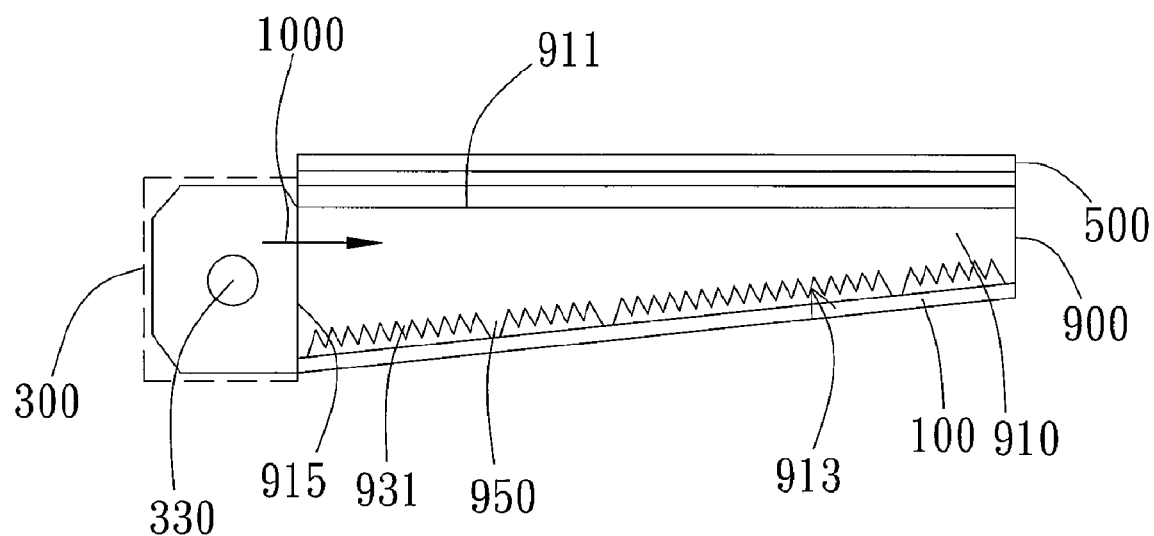
FIG. 9a is a cross-sectional schematic diagram of another embodiment of the backlight module in accordance with the present invention.

FIG. 9a is a preferred embodiment of the present invention. In this embodiment, the microstructure surface is disposed on the bottom surface 913 of the plate 910, and the reflector 100 is disposed under the bottom surface 913. Moreover, the optical films 500 are disposed above the top surface 911 of the plate 910. As shown in FIG. 9a, the protrusions 950 disposed on the microstructure surface touch against the reflector 100 to prevent the microstructures 931 disposed on the microstructure surface from contacting directly with the reflector 100. In other words, a gap exists between the microstructures 931 and the reflector 100. Through disposing the protrusions 950, the microstructures 931 are prevented from damaging the reflector 100 or from self damage caused by the microstructures 931 contact with the reflector 100.

Figure 9B:
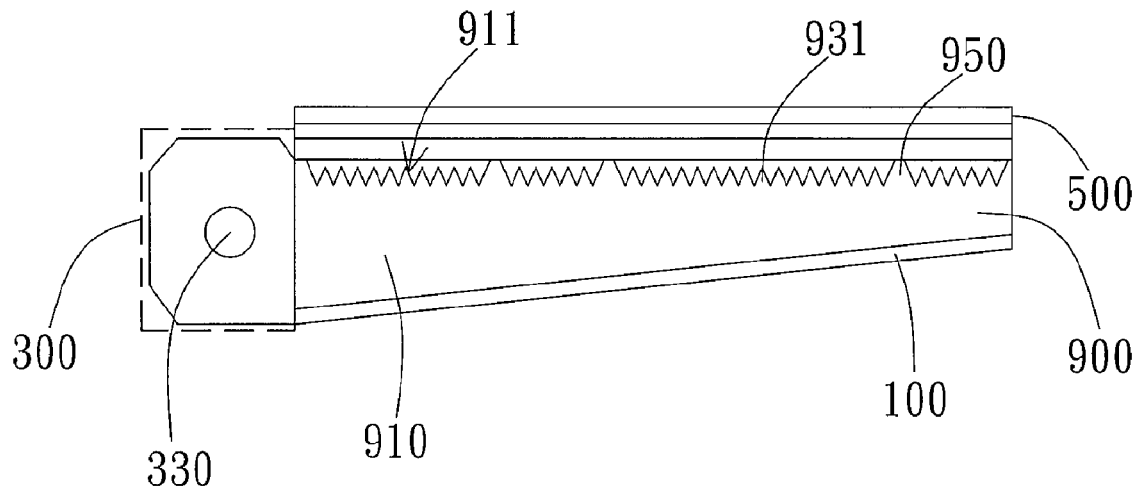
FIG. 9b is a cross-sectional schematic diagram of a further embodiment of the backlight module in accordance with the present invention.

FIG. 9b shows another embodiment of the present invention. In this embodiment, the microstructure surface is disposed on the top surface 911 of the plate 910, and the plurality of optical films 500 are disposed above the top surface 911 of the plate 910. The protrusions 950 disposed on the microstructure surface touch against the optical films 500 to prevent the microstructures 931 disposed on the microstructure surface from contacting directly with the optical films 500. In other words, a gap exists the microstructures 931 and the optical films 500. Through disposing the protrusions 950, the microstructures 931 are prevented from damaging the optical films 500 or from self damage caused by rubbing the microstructures 931.

Figure 10:
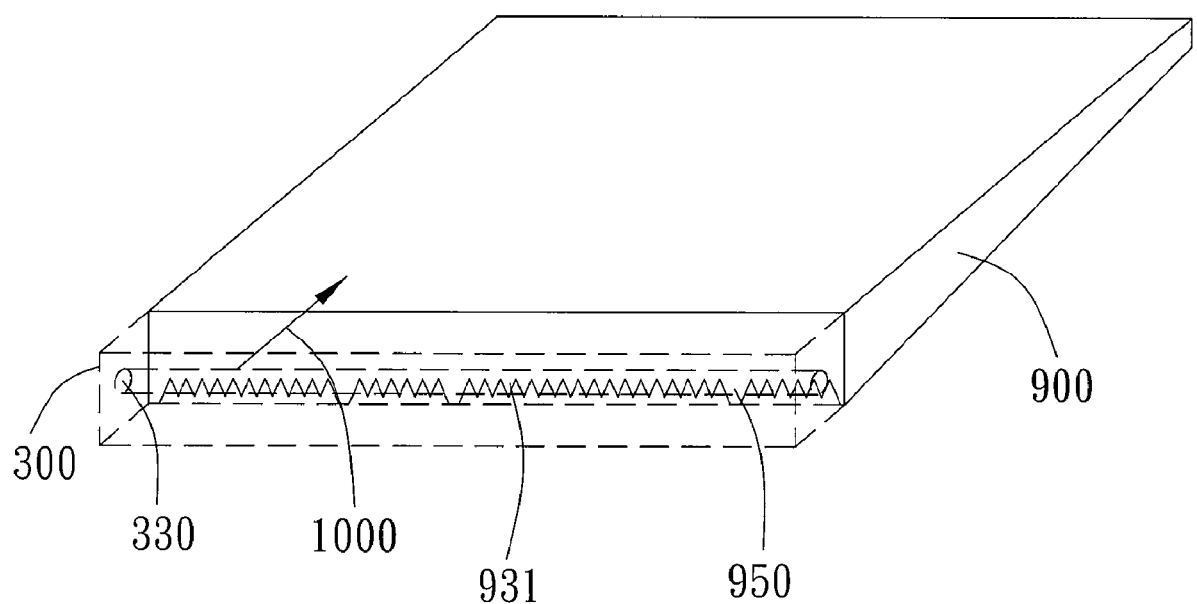
FIG. 10 illustrates a schematic diagram of one assembly embodiment of the light guide panel and the microstructure surface.

In the preferred embodiment shown in FIG. 9a, the microstructures 931 and the protrusions 950 are perpendicular to the incident direction 1000 of light produced by the light source module 300. In other words, the microstructures 931 and the protrusions 950 are disposed parallel to the lamp tube 330. However, in another preferred embodiment shown in FIG. 10, the microstructures 931 and the protrusions 950 may parallel the incident direction 1000 of light produced by the light source module 300. Namely, the microstructures 931 and the protrusions 950 are disposed perpendicular to the lamp tube 330.

Based on various design requirements, one function of the disposed microstructures 931 is to change light paths and to direct the light to go toward the upper end of the light guide panel 900. Moreover, the microstructures 931 may also possess light diffusion capability. In order to achieve various optical effects, density distribution of the microstructures 931 disposed on the microstructure surface may vary. In the embodiment shown in FIG. 6, spaces 935 between the adjacent protrusions 950 are filled with the microstructures 931 disposed on the micro-structure surface. However, in the embodiment shown in FIG. 8, the microstructures 931 disposed on the microstructure surface may not necessarily fill all the spaces 935 between the adjacent protrusions 950.

Since the microstructures 931 are susceptible to damage and are often partially scraped during transport or vibration tests, these constantly lead to the loss of the optical characteristics. Consequently, the protrusions 950 disposed on the microstructure surface will prevent the scrape issue of the microstructures 950 and also protect the optical elements within the backlight module. As the preferred embodiment shown in FIG. 9a, the protrusions 950 touching against the reflector 100 help prevent contact abrasion between the microstructures 931 and the reflector 100 caused by transport, vibration tests or other movements. Therefore, the microstructures 931 and the reflector 100 are protected, and the number of defective products is reduced. In addition, the overall production yield of the backlight module is enhanced, and the cost of production is reduced.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the light guide panel 900 to the wedge form disclosed, but on the contrary, the invention is to cover all modifications, alternate constructions and equivalents falling within the spirit and scope of the invention. Accordingly, the invention is not limited except as by the appended claims.

What is claimed is:

1. A light guide panel for a backlight module having an optical element, comprising:
   a plate having a microstructure surface;
   a plurality of microstructures disposed on the microstructure surface; and
   a plurality of protrusions disposed on the microstructure surface, wherein heights of the protrusions are greater than those of the microstructures, and more than one microstructure is disposed between the adjacent protrusions, the protrusions are configured to touch against the optical element and a gap exists between the microstructures and the optical element to prevent the microstructures from directly contacting the optical element.

2. The light guide panel of claim 1, wherein the microstructure surface includes a bottom surface of the plate.

3. The light guide panel of claim 1, wherein the microstructure surface includes a top surface of the plate.

4. The light guide panel of claim 1, wherein one side of the plate includes a light entrance surface.

5. The light guide panel of claim 1, wherein numbers of the microstructures disposed between the adjacent protrusions range between 5 and 20.

6. The light guide panel of claim 1, wherein intervals between the adjacent protrusions range between 0.25 millimeter (mm) and 1 mm.

7. The light guide panel of claim 1, wherein the heights of the protrusions are at least 1 mm higher than those of the microstructures.

8. The light guide panel of claim 1, wherein the microstructures include a plurality of elongated prisms.

9. The light guide panel of claim 8, wherein the protrusions parallel the adjacent elongated prisms.

10. The light guide panel of claim 1, wherein the microstructures include a plurality of protruding parts.

11. The light guide panel of claim 1, wherein the protrusions include a plurality of bar structures.

12. The light guide panel of claim 11, wherein the bar structures extend along the microstructure surface.

13. The light guide panel of claim 11, wherein the bar structures have trapezoid cross sections.

14. The light guide panel of claim 13, wherein a top surface width of the trapezoid cross sections ranges between 5 micrometer (μm) and 15 μm.

15. The light guide panel of claim 11, wherein the bar structures have hemispherical cross sections.

16. The light guide panel of claim 1, wherein the protrusions include a plurality of protruding posts.

17. The light guide panel of claim 1, wherein the plurality of the microstructures are disposed around each of the protrusions.

18. A backlight module, comprising:
   a light source module;
   a light guide panel disposed close to the light source module, the light guide panel comprising:
      a plate having a microstructure surface;
      a plurality of microstructures disposed on the microstructure surface; and
      a plurality of protrusions disposed on the microstructure surface, wherein heights of the protrusions are greater than those of the microstructures, and more than one microstructure is disposed between the adjacent protrusions; and
   an optical element disposed parallel to the light guide panel, wherein the protrusions touch against the optical element and a gap exists between the microstructures and the optical element to prevent the microstructures from directly contacting the optical element.

19. The backlight module of claim 18, wherein the optical element comprises a reflector, the microstructure surface includes a bottom surface of the plate, and the reflector is disposed under the microstructure surface, the plurality of protrusions are against the reflector.

20. The backlight module of claim 18, wherein one side of the plate forms a light entrance surface, and the light source module is disposed corresponding to the light entrance surface.

21. The backlight module of claim 18, wherein numbers of the microstructures disposed between the adjacent protrusions range between 5 and 20.

22. The backlight module of claim 18, wherein intervals between the adjacent protrusions range between 0.25 mm and 1 mm.

23. The backlight module of claim 18, wherein the heights of the protrusions are at least 1 mm higher than those of the microstructures.

24. The backlight module of claim 18, wherein the microstructures include a plurality of elongated prisms.

25. The backlight module of claim 24, wherein the elongated prisms parallel incident direction of light produced by the light source module.

26. The backlight module of claim 24, wherein the elongated prisms are perpendicular to incident direction of light produced by the light source module.

27. The backlight module of claim 24, wherein the protrusions parallel the adjacent elongated prisms.

28. The backlight module of claim 18, wherein the microstructures include a plurality of protruding parts.

29. The backlight module of claim 18, wherein the protrusions include a plurality of bar structures.

30. The backlight module of claim 29, wherein the bar structures extend along the microstructure surface.

31. The backlight module of claim 29, wherein the bar structures have trapezoid cross sections.

32. The backlight module of claim 31, wherein a top surface width of the trapezoid cross sections ranges between 5 μm and 15 μm.

33. The backlight module of claim 29, wherein the bar structures have hemispherical cross sections.

34. The backlight module of claim 18, wherein the protrusions include a plurality of protruding posts.

35. The backlight module of claim 18, wherein the optical element comprises an optical film, the microstructure surface includes a top surface of the plate, and the optical film is disposed on the microstructure surface, the plurality of protrusions are against the optical film.

36. The backlight module of claim 18, wherein the plurality of the microstructures are disposed around each of the protrusions.

* * * * *

UNITED STATES PATENT AND TRADEMARK OFFICE
CERTIFICATE OF CORRECTION

PATENT NO. : 7,682,063 B2 Page 1 of 1
APPLICATION NO. : 11/861410
DATED : March 23, 2010
INVENTOR(S) : Chih-Yen Chen and Han-Ping Kuo It is certified that error appears in the above-identified patent and that said Letters Patent is hereby corrected as shown below:

On the Title Page, at item (73) (the assignee), immediately following "AU" please delete "Optroncis" and substitute therefor --Optronics--.

Signed and Sealed this

Twenty-second Day of June, 2010

David J. Kappos
*Director of the United States Patent and Trademark Office*